April 20, 1937.  E. J. HANSEN  2,078,138
MEASURING INSTRUMENT
Filed Sept. 14, 1936  2 Sheets-Sheet 1

Eugene J. Hansen
INVENTOR

BY Victor J. Evans & Co.
ATTORNEYS

April 20, 1937.                E. J. HANSEN                 2,078,138
                           MEASURING INSTRUMENT
                          Filed Sept. 14, 1936        2 Sheets—Sheet 2
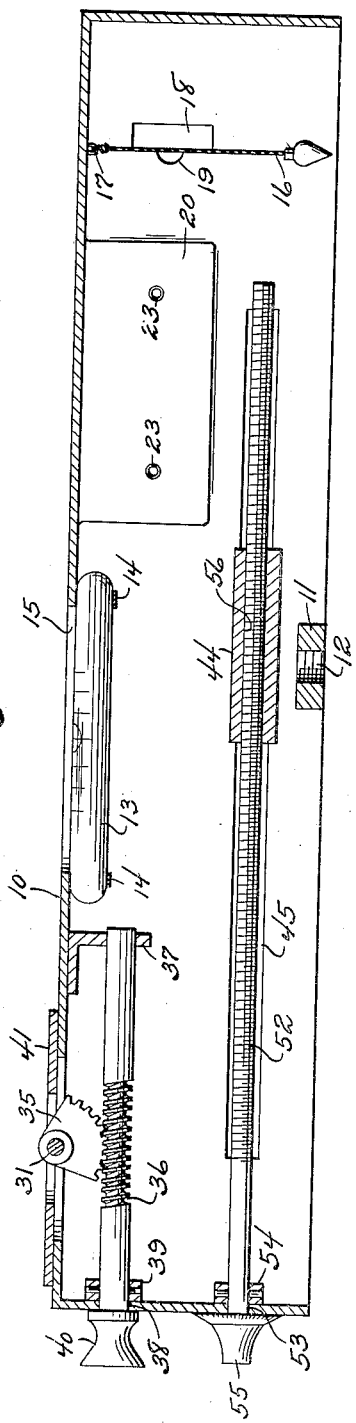
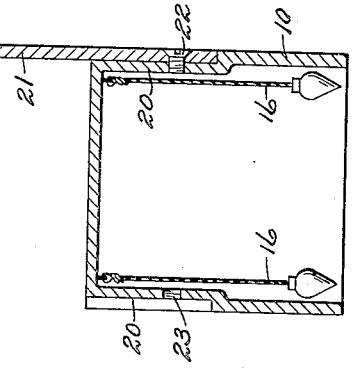
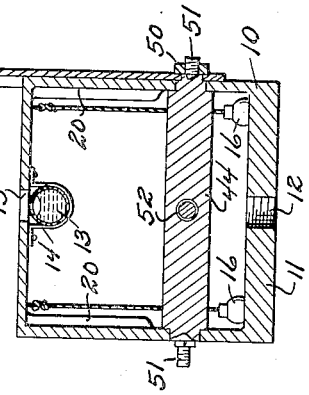
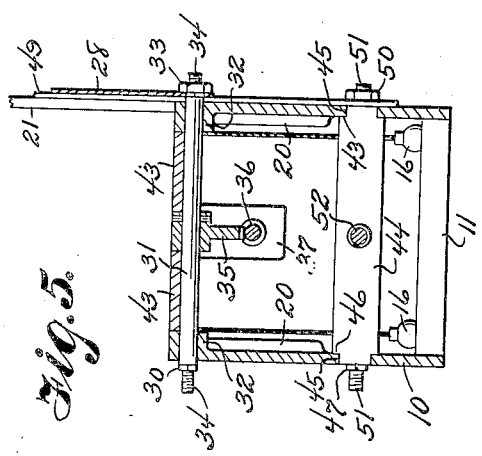
Eugene J. Hansen
INVENTOR
BY Victor J. Evans & Co.
ATTORNEYS Patented Apr. 20, 1937

2,078,138

UNITED STATES PATENT OFFICE 2,078,138

MEASURING INSTRUMENT

Eugene J. Hansen, Portland, Oreg.

Application September 14, 1936, Serial No. 100,707

2 Claims. (Cl. 33—97)

This invention relates to measuring instruments of the trigonometrical type for use in the building and engineering professions and for other purposes.

The primary object of the invention is to provide a simple and efficient device in which the protractor, sine arm and radius arm are interchangeable from one side to the other so as to facilitate using the device on right or left curves or in a horizontal position.

A further object is to provide a calculating instrument of this type having a novel protractor, level and plumb cooperating with a slidably mounted shaft operated block carrying a sine arm, the parts being more conveniently adjusted by the operator to give the desired readings in solving problems than hitherto possible with similar devices now in use.

A further object is to provide a device of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 4 is a longitudinal sectional view of the instrument with parts removed.

Figure 1:
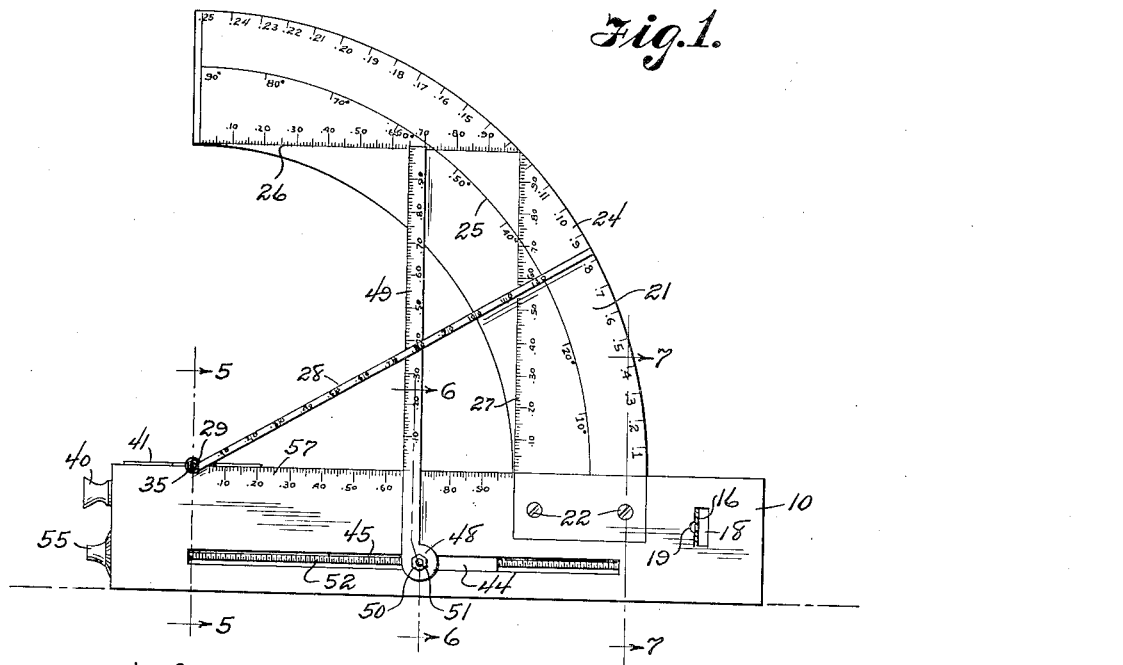
Figure 1 is a side elevation of a measuring instrument constructed in accordance with the invention.
Figure 2:
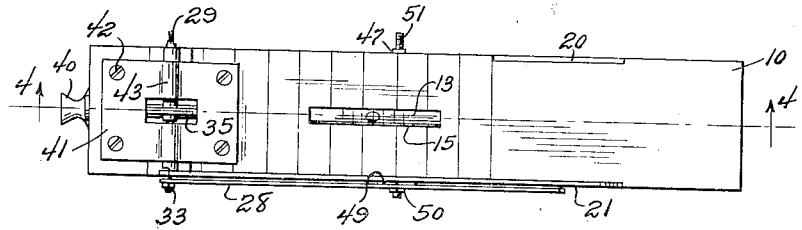
Figure 2 is a plan view of the instrument.
Figure 3:
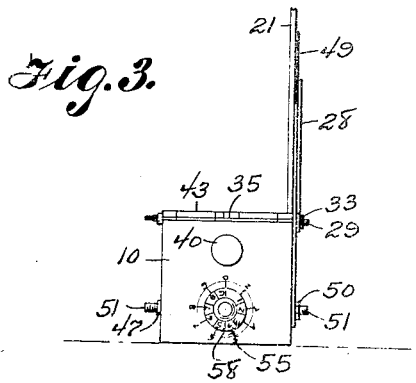
Figure 3 is a front end elevation of the instrument.

Figures 5, 6, and 7 are enlarged cross sectional views taken respectively on the lines 5—5, 6—6 and 7—7, of Figure 1.

Referring now to the drawings in which like characters of reference designate similar parts in the various views, 10 designates a substantially oblong metal casing open at the bottom and having a transverse bar 11, as shown in Figures 4 and 6, connecting the sides midway between the ends at the bottom and provided with a threaded opening 12 to receive a mounting bolt, not shown. A spirit level 13 is secured to the top of the casing by strap brackets 14 and is exposed by a sight opening 15 formed in the top of the casing. A pair of plumbs 16 are suspended from eyes 17 depending from the top of the casing near the rear end wall thereof. Substantially oblong sight openings 18 are formed in the side walls of the casing, one longitudinal wall of each opening coinciding with the plumb when it is in vertical position, as best shown in Figure 4. A substantially semi-circular opening 19 is formed at the center of the wall just mentioned to expose the plumb for a portion of its length.

As best shown in Figure 7 the casing is provided in its opposite side walls near the plumbs with depressed seats 20 to interchangeably receive a quadrant arm 21. A pair of screws 22 are interchangeably received in openings 23 in the seats to secure the quadrant arm selectively in either seat so that the instrument may be used as a protractor on right or left curves or in a horizontal position.

The quadrant arm is provided on each side with a scale 24 disposed at the outer curved edge and with a scale 25 concentric with the outer scale and disposed intermediate the outer edge and the inner edge of the quadrant arm. The outer scales are graduated from 0 to 0.25 while the inner scales are graduated from 0 degree to 90 degrees. The quadrant arm is also provided on each side with a co-tangent scale 26 graduated in tenths from .1 to 1 and also with a tangent scale 27 graduated in tenths from 0 to 1. The co-tangent scale and the tangent scale extend at a right angle to each other as is customary and intersect the outer curved edge of the quadrant arm at their common 1 reading.

A radius arm 28 is provided with an eye 29 at the bottom to be selectively engaged on squared shoulders 30 on the ends of a hinge pin 31 which is mounted in bearings 32 disposed in the top of the casing near the front end thereof. A nut 33 is interchangeably received on the threaded ends 34 of the hinge pin to secure the radius arm to the hinge pin. The radius arm is provided on each side with a scale graduated in tenths from .1 to .12.

The radius arm is swingable over the quadrant arm from a position coinciding with the top of the casing to a position perpendicular to the top of the casing, by means of a segment gear 35 which is fixed to the center of the hinge pin 31 and meshes with a worm shaft 36. The worm shaft is journaled at one end in a bracket 37 depending from the top of the casing as shown best in Figure 4, and at the front end is journaled in an opening 38 formed in the front end wall of the casing. A collar 39 on the shaft on the inside of the casing coacts with a knob 40 on the shaft on the outside of the casing to prevent endwise movement of the shaft. A plate 41 is screwed to the top of the casing, as shown at 42 and is provided with half round bearings 43 that house the hinge pin 31.

A block 44 is slidably fitted at the ends in parallel guide slots 45 formed in the side walls of the casing and is provided with guide shoulders 46 which engage the inner faces of the side walls. The ends of the block are provided with squared shoulders 47 to interchangeably receive an eye 48 of a sine arm 49 that extends perpendicular to the guide slots 45 and is adapted to be intercepted by the radius arm when the latter is turned through its arc of movement. A nut 50 is interchangeably received on threaded studs 51 disposed axially on the shoulders 45 to secure the sine arm in place. The sine arm is provided on each side with a scale graduated in tenths from 0 degree to 90 degrees.

For moving the block a feed screw 52 is mounted at the front end in an opening 53 formed in the front end wall of the casing and is held against endwise movement by a collar 54 on the inside of the casing coacting with a button 55 on the outside of the casing. The feed screw is engaged in a threaded opening 56 formed in the block. As the button 55 is turned in either direction the feed screw will move the block longitudinally of the casing to move the sine arm longitudinally of the casing.

A co-sine scale 57 is marked on each side wall of the casing at the top thereof. The scale is graduated in tenths from 0 degree to 90 degrees and has its zero point in the axis of the hinge pin 31.

The button 55 is provided with a vernier 58. A complete turn of the button 55 produces a travel of $\frac{1}{10}$ inch on the sine arm 49.

In practice the tangent of any angle made by the radius arm 28 is read on the scale 27 while the co-tangent is read on the scale 26. The sine and co-sine of the angle are read on the scales 49 and 57. Since both sides of the quadrant or protractor 24, the sine arm 29, the casing 10, and the radius arm 28, are equipped with scales, these members may be transferred from one longitudinal side of the casing to the other longitudinal side so as to facilitate the use of the instrument on right or left curves or in a horizontal position.

From the above description it is thought that the construction and operation of the invention will be fully understood without further explanation.

What is claimed is:

1. A measuring instrument of the trigonometrical type comprising a casing, a quadrant thereon, a slidably mounted shaft operated block on the casing, a sine arm carried by the block and adapted to intercept the quadrant, a pivotally mounted radius arm on the block adapted to intercept the quadrant, and means for interchangeably mounting the quadrant and sine arm on opposite sides of the casing to facilitate using the instrument on right or left curves or in a horizontal position.

2. In a measuring instrument of the type described, a casing, a quadrant arm, depressed seats in the side of the casing interchangeably receiving one end of the quadrant arm, a sine arm, a block movable longitudinally of the casing and carrying the sine arm, guides on the casing for directing movement of the block, a feed screw device for moving the block to adjusted positions, lugs on the ends of the block projecting exteriorly of the casing, said lugs being adapted to interchangeably receive the sine arm, a radius arm hinged to the casing, a feed screw device for swinging the radius arm on its hinge, and squared shoulders on said means for interchangeably receiving the radius arm and selectively mounting the same upon either longitudinal side of the casing.

EUGENE J. HANSEN.